UNITED STATES PATENT OFFICE.

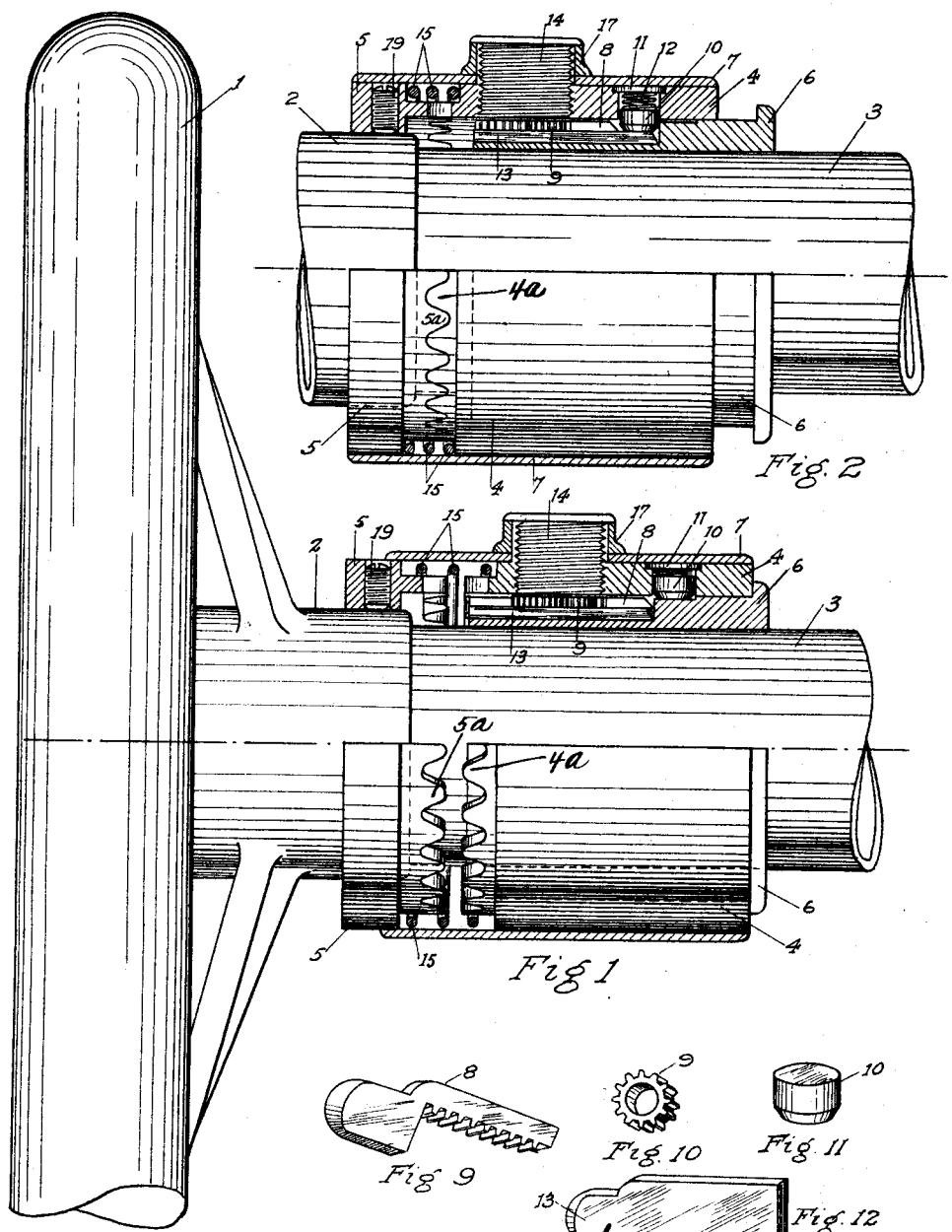

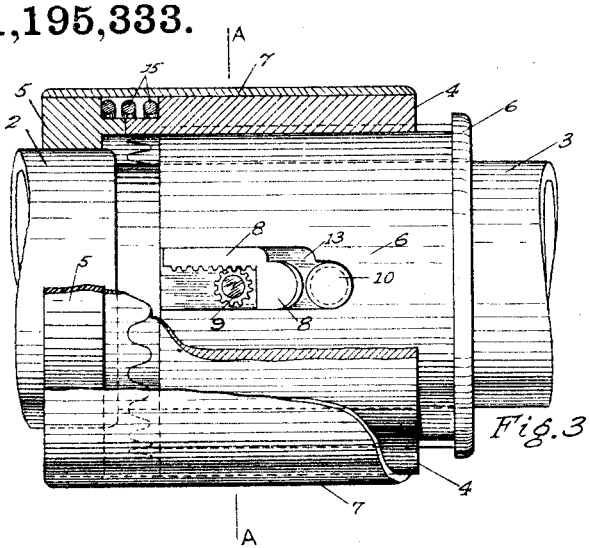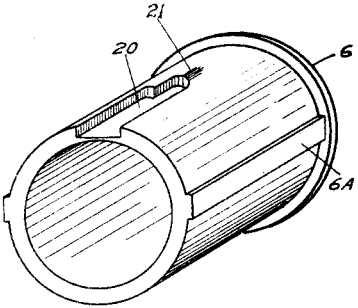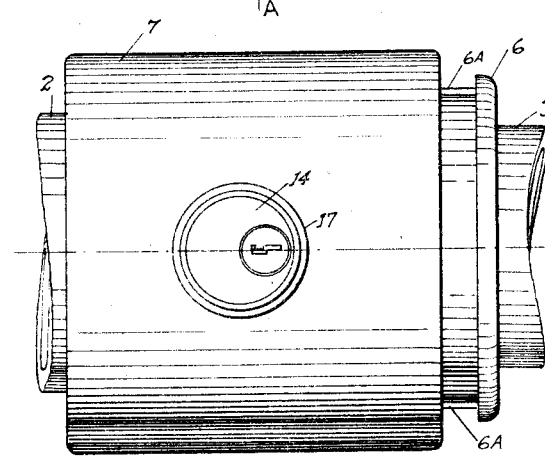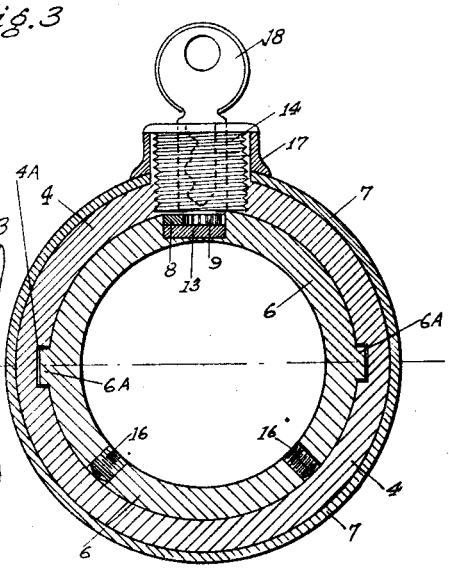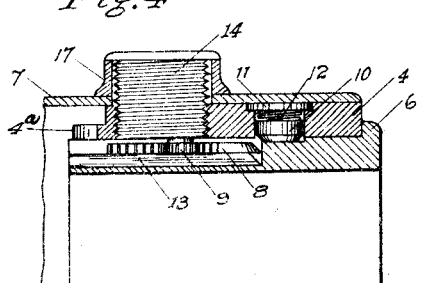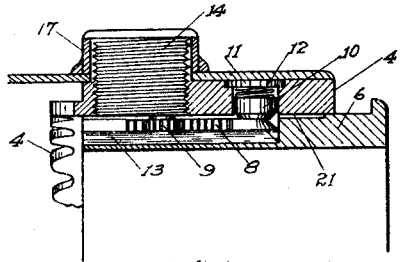

JUNIUS A. BOWDEN, OF LOS ANGELES, CALIFORNIA.

STEERING-WHEEL LOCK FOR AUTOMOBILES.

1,195,333.  Specification of Letters Patent.  Patented Aug. 22, 1916.

Application filed February 23, 1916. Serial No. 79,959.

*To all whom it may concern:*

Be it known that I, JUNIUS A. BOWDEN, a citizen of the United States, residing at Los Angeles, in the county of Los Angeles, State of California, have invented new and useful Improvements in Steering-Wheel Locks for Automobiles, of which the following is a specification.

This invention relates to a locking device for a steering wheel of an automobile.

The object is to render the steering wheel inoperative when the automobile is left alone, to prevent guiding the car.

This invention embodies making a simple and inexpensive locking device that can be automatically locked and to secure the device to the steering column and hub of the steering wheel, where it remains permanent when the device is unlocked.

A further provision of this invention is to provide means whereby the unlocking of the mechanism sets the lock in position so that it can be automatically locked without the key.

Referring to the drawings: Figure 1 shows a half elevation also a half longitudinal section of the device secured to the hub of the steering wheel 2 and the steering column 3, assembled in an unlocked position; Fig. 2 shows a half section also a half elevation of the device in a locked position assembled on parts 2 and 3; Fig. 3 is a plan view with the jacket 7 and sleeve 4 broken away and a plan view of the locking mechanism parts 8, 9 and 10, assembled in recess 20 of support part 6 (see Fig. 8) with the device locked; Fig. 4 shows the completed device in elevation, secured to parts 2 and 3 in a locked position; Fig. 5 shows a sectional view on line A—A of Fig. 3, also shows the tongues 6$^A$ and grooves 4$^A$ and set screws 16, the latter for securing part 6 to part 3 and a sectional view of parts 8, 9 and 13, assembled in position in recess 20 of part 6, (see Fig. 8); Fig. 6 is a sectional view, showing locking disk 10 elevated in pocket 4, in position to be carried back where it will rest on seat 21 when the device is unlocked; Fig. 7 shows a sectional view of the device with part 10 in pocket of part 4, after it has been carried back in its resting position with the device unlocked; Fig. 8 is a detail of part 6, showing recess 20 and tongue 6$^A$; Fig. 9 is a detail of elongated member 8; Fig. 10 is a detail of pinion 9; Fig. 11 is a detail of locking disk 10; Fig. 12 is a detail of liner part 13.

Referring more specifically to the drawings and for a further explanation of the operation and assembling of the device, the wheel 1 (Fig. 1) is removed from steering column 3, clutch part 5 is secured to the hub of the wheel 2 by means of a set screw 19, then before placing the wheel on column 3, part 6 is fastened to column 3 by set screw 16, then part 8 (Fig. 9) is placed in recess 20 (recess shown in Fig. 8), insert spring 12 and disk 10 in pocket of part 4, then slide part 4 by means of guides 4$^A$ and 6$^A$ (Fig. 5) into position on part 6. It is to be understood that cylinder lock 14 with pinion 9 have been connected to part 4 as shown in Figs. 1 and 2 before sliding part 4 onto part 6. Then place liner 13 (Fig. 12) below part 8 bringing it up into position where the pinion 9 and teeth of part 8 mesh together and arranged as shown in Fig. 3, then place the coil spring 15 on the outside of the teeth of parts 4 and 5 as shown in Figs. 1 and 2. Following this, the wheel 1 is placed in position on the steering column 3 to a point where the teeth 4$^a$ and 5$^a$ mesh together as shown in Fig. 2. This completes the device in a locked position. Then to disengage the teeth 4$^a$ and 5$^a$ as shown in Fig. 2, the key 18 of Fig. 5 is inserted in lock and rotated, thus revolving pinion 9 in mesh with part 8 and moving part 8 under disk 10 which elevates it into the position shown in Fig. 6. The spring 15 shown in Fig. 2 expands and moves part 4 back against the flange of part 6 leaving it in the position shown in Figs. 1 and 7 in an unlocked position. In order to lock the device, all that is necessary is to slide part 4 firmly against the tension of spring 15 and when the locking disk 10 is brought in a registering position over the narrow end of recess 20 (see Fig. 8) the spring 12 forces disk 10 into the position shown in Fig. 2, and the tension of the spring 15 firmly against the shoulder of part 4 and shoulder of part 5 causes disk 10 to be wedged between parts 4 and 6, it thus remains in that position until the key 18 (shown in Fig. 5) is inserted and unlocks the device.

The plate 11 shown in Figs. 1, 2, 6 and 7 is made of hard tempered steel to protect the locking disk 10 from being easily removed by drilling through jacket 7. For parts 4, 5 and 6, I would preferably use die castings and as the metal of these is comparatively soft a steel jacket 7 is secured on the outside of part 4 as shown in Figs. 1 and 2 which protects all the parts from being easily cut into. Pocket in part 4 and recess in narrow end of part 6 may be reinforced with hard metal for better wearing surface. Collar part 17 as shown in Figs. 1 and 2 slides over the lock 14 and the lock 14 may be firmly secured in position by means of a pin passing through part 17 against lock 14 and owing to the contour or shape of part 17 with respect to part 7, it would be difficult to remove the lock 14 by the application of a wrench on the outside. Part 5 shown secured to hub 2 (see Figs. 1 and 2) may be fastened by means of a key. The part 5 may be done away with altogether by having teeth made integral with hub 2.

What I claim is:

1. In a device for locking the steering wheel of an automobile, in combination with the fixed housing of a steering rod, a clutch part associated with the steering wheel, an annular member rigidly secured upon said housing near the hub of the steering wheel, a sleeve adapted to slide upon said member and supported thereon, connecting chambers formed between said member and sleeve, said sleeve having a clutch portion at one end, means adapted to connect the clutch part associated with the wheel and the clutch portion of the sleeve, a locking disk and an unlocking member in said chambers, said locking disk adapted to automatically interlock the sleeve and said annular member when the clutch portion of the sleeve and the clutch part associated with the wheel are connected, other means adapted to operate said unlocking member and locking disk whereby the sleeve may be unlocked from said annular member to give free movement of the steering wheel.

2. In a device for locking the steering wheel of an automobile, in combination with the fixed housing of a steering rod, an annular member rigidly secured upon said housing near the hub of the steering wheel, a sleeve adapted to slide upon said member and supported thereon, connecting chambers formed between said member and sleeve, said sleeve having a clutch portion at one end, a clutch on the hub of the steering wheel, means adapted to connect the clutch on the hub of the wheel and the clutch portion of the sleeve, a locking disk and an unlocking member in said chambers, said locking disk adapted to automatically interlock the sleeve and annular member when the clutch portion of the sleeve and the clutch on the hub of the wheel are connected, key operable means installed in said sleeve adapted to operate said unlocking member and locking disk whereby the sleeve may be unlocked from said annular member to give free movement of the steering wheel.

3. In a device for locking the steering wheel of an automobile, in combination with a fixed housing of the steering rod, an annular member rigidly secured upon the outside of said housing near the hub of the steering wheel, a sleeve slidably engaging the outside of said member, said sleeve having a clutch portion at one end, a clutch part on the hub of the steering wheel, an internal pocket formed in said sleeve, a locking disk in said pocket, a recess formed in said member, an unlocking member in said recess, means adapted to connect said recess with said pocket, internal guide means arranged between said annular member and sleeve whereby the recess and pocket are held in alinement with each other and whereby the sleeve is prevented from rotation on the annular member, said sleeve adapted to slide upon the outside of said member toward said hub and unite the clutch part of the hub with the clutch portion of the sleeve into mesh, said locking disk adapted to automatically interlock the sleeve and annular member together when the clutch portion of the sleeve and the clutch part of the hub are in mesh and prevent the steering wheel from rotation, other means carried by the sleeve and associated with said unlocking member adapted to shift the locking disk to an unlocked position and release the clutch on the hub with the clutch portion of the sleeve.

4. In a locking device of the character described, comprising a sleeve with a clutch portion at one end, an annular member, the sleeve slidably engaging the outside of said member, a key operable lock carried by said sleeve, a steering wheel having a clutch portion, means for meshing the clutch portion of the sleeve with the clutch portion of the wheel, means forming an inner pocket in said sleeve, a recess in said annular member, a locking disk in said pocket, a member in said recess adapted to be moved by said lock beneath said locking disk and lift the disk from said recess into said pocket whereby the clutch portion of the sleeve and clutch portion of the wheel may be separated.

5. In a locking device of the character described, comprising a slidable sleeve having teeth formed on one end, an annular shoulder formed on the exterior of said sleeve near the base of the teeth, a key operable lock carried by said sleeve, an annular member having teeth formed on one end, an annular shoulder formed on the exterior of said member near the base of the teeth, a spring engaging the shoulder of the sleeve and shoulder of the annular member, said spring surrounding the teeth of said member and teeth of the sleeve, means adapted to mesh the teeth of the member and teeth of the sleeve, means adapted to lock the sleeve to said member when said teeth are in mesh, said spring adapted to hold the teeth of said member and the teeth of the sleeve apart when not in mesh and prevent the teeth meshing accidentally.

6. In a locking device of the character described, comprising a sleeve rigidly secured to the housing of a steering rod near the steering wheel, an annular flange formed on the exterior of said sleeve, a slidable sleeve, said slidable sleeve having teeth formed on one end and an annular exterior shoulder formed near the base of said teeth, the slidable sleeve adapted to slidably engage the exterior of the first mentioned sleeve, an annular member on the steering wheel, said member having teeth formed at one end and an annular shoulder formed near the base of the teeth on the exterior of said member, a spring engaging the shoulder on the sleeve and the shoulder on said annular member, means for meshing the teeth of the slidable sleeve and the teeth of said annular member, means for automatically locking the device with said teeth in mesh, other means carried by said slidable sleeve for unlocking the device.

7. In a locking device of the character described in combination with a steering wheel and a housing for a steering rod, comprising a clutch part on said wheel, a support member rigidly secured to said housing near the wheel, a recess formed in said member, said recess having a guide wall and an end wall, a tooth member in said recess, said tooth member adapted to be guided by said guide wall, a sleeve having a clutch part at one end, said sleeve adapted to slidably engage the outside of said support member, an inner pocket formed in said sleeve, a disk, said disk adapted to impinge against the side of said pocket and impinge against the end wall of said recess whereby said support member and the sleeve may be locked together when the clutch part of the wheel and the clutch part of the sleeve are in mesh, means adapted to move said tooth member in the recess against the disk and dislodge the disk from impingement against said end wall whereby said device may be unlocked.

8. In a locking device of the character described, in combination with a steering wheel and a housing of a steering rod, comprising a support member rigidly secured to the housing of the steering rod, a sleeve adapted to slidably engage the outside of said member, said sleeve carrying a cylinder lock, said lock extending through the side wall of said sleeve, a pinion secured to the base of the cylinder of said lock and parallel therewith, a recess in said member, a tooth member in said recess, said pinion adapted to mesh with the tooth member, an inner pocket in said sleeve, a disk in said pocket, said disk adapted to extend into said recess, means adapted to operate the cylinder of said lock and rotate the pinion whereby the tooth member is adapted to be moved and coöperate with the disk, for the purpose described.

9. In a locking device of the character described, in combination with a steering wheel and a housing of a steering rod, comprising a support member rigidly secured to the housing of the steering rod, a sleeve adapted to slidably engage the outside of said member, said sleeve carrying a cylinder lock, said lock extending through the side wall of said sleeve, a pinion secured to the base of the cylinder of said lock and parallel therewith, a recess in said member, a tooth member in said recess, said tooth member having a portion formed with a beveled edge, said pinion adapted to mesh with the tooth member, an inner pocket in said sleeve, a disk in said pocket, said disk adapted to extend into said recess, said disk having one end formed with its corner beveled, means adapted to operate the cylinder of said lock and rotate the pinion whereby the tooth member is adapted to move and coöperate with the disk, for the purpose described.

10. In a locking device of the character described, comprising a sleeve rigidly secured to the housing of a steering rod near the steering wheel, an annular flange formed on the exterior of said sleeve, a slidable sleeve, said slidable sleeve having teeth formed on one end, said slidable sleeve adapted to engage the exterior of the first mentioned sleeve, an annular member on the steering wheel, said member having teeth formed at one end, means for meshing the teeth of the slidable sleeve and the teeth of said annular member, means for automatically locking the device with the teeth in mesh, other means carried by the slidable sleeve for unlocking the device.

11. In a locking device for a steering wheel of an automobile, in combination with a fixed housing of the steering rod, a slidable sleeve supported upon said housing, said sleeve having a clutch part at one end, a clutch part on the hub of the steering wheel, an internal pocket formed in said sleeve, a locking disk in said pocket, a protecting plate of harder metal at the end of said pocket, means adapted to engage the clutch part of the sleeve with the clutch part on said hub, means whereby said disk is adapted to automatically lock said sleeve from movement on said housing when the clutch part on the hub and the clutch part of the sleeve are in engagement with each other, key operable means installed in said sleeve, said means adapted to coöperate with other means whereby said disk may be shifted and release said engagement for the purpose described.

12. In a locking device for a steering wheel of an automobile in combination with a fixed housing of a steering rod, a clutch part on the hub of the steering wheel, a support member rigidly secured upon said housing near said hub, a sleeve having a clutch part formed at the end of the sleeve, an internal pocket formed within said sleeve, said support member having a recess formed therein, said sleeve adapted to slide upon said support member whereby said pocket may be brought into communication with said recess, a slidable disk in said pocket, means adapted to engage the clutch part on the hub of the steering wheel with the clutch part on the sleeve whereby said disk may slide into said recess and automatically lock the sleeve to said support member, means carried by said sleeve for lifting said disk from said recess into said pocket adapted to unlock the sleeve from said support member for the purpose described.

13. In a locking device of the character described, in combination with a steering wheel and housing of a steering rod of an automobile, comprising a clutch part on said wheel, a support member rigidly secured to the housing of the steering rod near said wheel, a sleeve having a clutch part at one end, said sleeve adapted to slidably engage the exterior of said support member, said member having a projection formed on its exterior at its lower end adapted to form a stop and hold said sleeve from displacement, means whereby said member and sleeve may be locked together when the clutch part of the sleeve and clutch part of the wheel are in mesh, means carried by said sleeve adapted to unlock the sleeve from the support member, means of an expansion spring adapted to hold the clutch part of the sleeve and clutch part of the wheel separated when the sleeve and support member are unlocked from each other.

In testimony whereof I have hereunto set my hand, at Los Angeles, California, this 18th day of Feby., 1916.

JUNIUS A. BOWDEN.